United States Patent [19]

Klopfer

[11] 3,976,385

[45] Aug. 24, 1976

[54] METHOD AND APPARATUS FOR SPLICING LINES

[75] Inventor: Henry Edward Klopfer, Sunnyvale, Calif.

[73] Assignee: Raychem Corporation, Menlo Park, Calif.

[22] Filed: Oct. 9, 1974

[21] Appl. No.: 513,307

[52] U.S. Cl. .......................... 403/284; 339/276 R; 174/94 R; 174/84 C

[51] Int. Cl.[2] ...................... B25G 3/28; F16G 11/00

[58] Field of Search ........... 403/285, 284, 274, 215; 339/276 R, 276 T, 97 C; 174/94 R, 84 C

[56] References Cited

UNITED STATES PATENTS

| | | | |
|---|---|---|---|
| 1,675,857 | 7/1928 | Liebowitz | 339/276 R |
| 1,906,128 | 4/1933 | Alexander | 403/215 X |
| 2,370,725 | 3/1945 | Gordon | 339/276 X |
| 2,651,671 | 9/1953 | Lanfear | 174/94 S X |
| 2,783,447 | 2/1957 | Watts | 339/97 C X |
| 2,901,725 | 8/1959 | Schuyler | 403/215 X |
| 2,958,723 | 11/1960 | Logan et al. | 339/276 R X |
| 3,008,119 | 11/1961 | Swengel | 339/276 R |

FOREIGN PATENTS OR APPLICATIONS

| | | | |
|---|---|---|---|
| 1,937,788 | 2/1971 | Germany | 403/285 |

*Primary Examiner*—Wayne L. Shedd
*Attorney, Agent, or Firm*—Lyon & Lyon

[57] ABSTRACT

The containment, splicing, or termination of the line is achieved by selective crimping along a housing. In a preferred form, the housing comprises a crimp barrel having a series of axially displaced apertures formed therein. A line, e.g. a wire, is inserted in the barrel, and a force is applied in registration with each aperture to deform the barrel and the line so that the deformed portion of the barrel maintains the deformed portion of the line against the aperture. The line scrapes against edges of the aperture to form a tight joint.

5 Claims, 9 Drawing Figures

METHOD AND APPARATUS FOR SPLICING LINES

BACKGROUND OF THE INVENTION

This invention relates to splicing ends of electrical conductors of an indefinite length, as well as to splicing ends of nonconductive lines.

One form of joining the ends of two indefinite lengths of lines or terminating a single line is a form of crimping. The line is placed into a housing. Housings may take many forms. For example, their cross sections may be oval, rectangular, circular or otherwise. One common form of housing is a tube or barrel. It should be understood, however, that the term barrel as discussed below is one specific embodiment of housings, and may take many other forms. Examples of lines are insulated or uninsulated electrically conductive wire, solid or stranded wire rope, nonconductive filaments, or other nonconductive lines. The conventional methods used for terminating one line in a housing or providing butt joint between the ends of first and second lines in a housing are crimping and swaging.

In a conventional crimp, a housing with a line inserted therein is squeezed from oposite sides. Extremely high crimping pressures are applied which deform not only the housing, but also deform the line being contained. The housing is effectively crushed onto the line to provide a frictional fit between the line and housing. The usual effect is to reduce the cross-sectional area of the line and consequently reduce the line's tensile strength. The ability of an electrically conductive line to carry electrical current is also often reduced. It is normally necessary to provide extremely high (with respect to the materials being crimped) forces in order to provide reliable contact between the housing and the line. In the process of crimping, it is desireable to displace oxides on the surface of the line at the interface within the housing and to provide a gas tight joint which will not permit the entry of moisture or other contaminants in order to prevent long term degradation of both mechanical and electrical connections. Swaging may be generally described as the squeezing of a softer material around a harder material. Swaging avoids deformation of the cross section of the line, but requires very high compression forces acting over large areas of contact. Only the housing is deformed, and the tensile strength of the joint is directly dependent on the friction between the line and the deformed housing. Conventional swaging configurations also do not provide for any form of resilience in reaction to axial forces applied along the line. Convention crimping, and to some extent swaging, does not eliminate the tendency of crimped material to return to its original shape.

SUMMARY OF THE INVENTION

It is therefore an object of the present invention to provide an improved method and apperatus for crimping a line in a housing in which crimping force is selectively applied to portions of a housing, and in which tensile strength of the mechanical connection is improved.

It is a further object of the present invention to provide a crimp joint of the type described in which minimal deformation of the transverse cross section of the line occurs.

It is also an object of the present invention to provide a crimp joint of the type described in which reliable gas tight points of contact between a line and a housing may be formed.

It is another object of the present invention in one form to provide a crimp barrel in which insulation on a line is abraded from the line at an interface of the crimp barrel with a discontinuity form therein to provide a form of stripping, whereby an electrical connection between the crimp barrel and the line is effected.

It is yet another object of the present invention in one form to provide a joint of the type described providing a degree of resilience in response to axial forces applied to a line.

Briefly stated, in accordance with the present invention, there is provided a crimp housing having a discontinuity such as an aperture or soft area formed therein. A line is inserted in the housing, and a force is applied to a wall in the housing opposite the discontinuity and in registration therewith. The means for applying the force against the housing deforms the portion of the housing and the portion of the line in registration with the discontinuity. While being crimped, the surface of the line is wiped firmly against the edges of the discontinuity in the housing. A plurality of discontinuities and points of application of force may be provided. This deformation and scraping of the line against the housing wall as the line is bent into the discontinuity may form a gas tight joint at the interface. Crimping pressures required to provide a reliable joint are greatly decreased, and the transverse cross sectional area of the line being crimped is not significantly reduced. Therefore, improved mechanical tensile strength of the joint is provided. In the case of a conductive line, higher electrical currents may pass through the joints than if the transverse cross-sectional area were reduced.

BRIEF DESCRIPTION OF THE DRAWINGS

The means by which the foregoing objects and features of novelty are achieved are pointed out with particularity in the claims forming the concluding portion of the specification. The invention, both as to its organization and manner of operation, may be further understood with reference to the following description taken in connection with the following drawings. Of the drawings:

DESCRIPTION OF THE PREFERRED EMBODIMENTS

Figure 1:
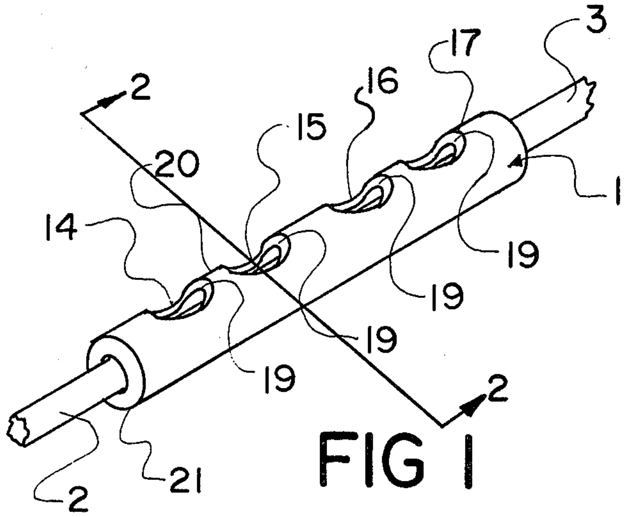
FIG. 1 is an perspective view of first and second lines inserted in a housing for crimping in accordance with the present invention.

Referring now to FIG. 1, there is illustrated a housing 1 for receiving ends of first and second lines 2 and 3. In the present embodiment, the housing 1 is a crimp barrel. The lines 2 and 3 may be solid wires, stranded wires, plastic rope, wire rope, plastic lines having a relatively high durometer value, or well-known forms of lines. The housing 1 will be referred to interchangeably as the housing 1 or the crimp barrel 1. It should be understood, however, that the housing 1 may take many other forms. For example the housing 1 may have a rectangular cross section for receiving a bus bar; it may have an oval cross section for receiving two circular lines, or it may take many other forms which will be readily apparent to those skilled in the art in accordance with the teachings below. The lines 2 and 3 are respectively inserted in the housing 1 and are crimped therein by suitable apparatus such as the apparatus of FIG. 3 to provide a strong, reliable joint.

Figure 2:
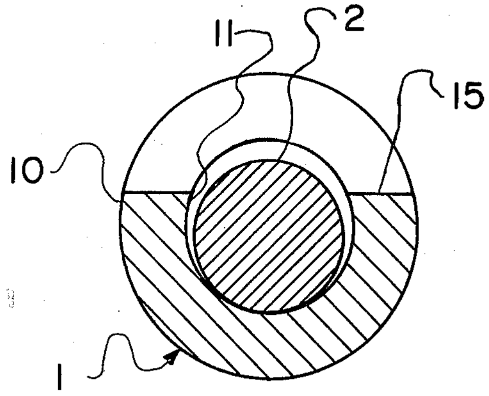
FIG. 2 is a transverse cross section taken along lines 2—2 of FIG. 1 illustrating a line in a housing before crimping.

The crimp barrel 1 and its relationship to the lines 2 and 3 are further described with reference to FIGS. 1 and 2. FIG. 2 is a transverse cross-sectional view taken along lines 2—2 of FIG. 1 and illustrates the line 2 in the crimp barrel 1. The line 3 is similarly disposed in the crimp barrel 1. The crimp barrel 1 in the present embodiment is of circular cross section in the transverse direction. The lines 2 and 3 are disposed axially. The crimp barrel 1 has an exterior wall 10 and an interior wall 11. Discontinuities 14, 15, 16, and 17 are each formed between the walls 10 and 11 and axially spaced along the length of the crimp barrel 1. In the present embodiment, the discontinuities 14–17 are circular apertures. The discontinuites 14—17 may comprise apertures of other shapes, or as described with respect to FIG. 9 below need not comprise apertures. The terms aperture and discontinuity will be used interchangeably for purposes of the present description, and it should be understood that the word aperture comprehends other forms of discontinuity. The apertures 14–17 are in circumferential registration. On other shapes of crimp barrel 1 in other embodiments, it may be said that the apertures are in alignment. In the present embodiment, four apertures are shown. The particular number of apertures to be provided on a crimp barrel 1 may be varied in accordance with further teachings below. In FIG. 2, the relationship of the aperture 15 to the housing 1 and line 2 is illustrated. This same description applies as well to the apertures 14, 16 and 17.

The aperture 15 may be formed, for example, by milling across the crimp barrel 1 in a transverse direction. Other well-known machining methods may be used. Alternatively, the crimp barrel 1 may be manufactured with apertures formed therein. Each of the apertures 14–17 has an axial interface surface 19 (FIG. 1) which is the intersection of the discontinuity 15 with the inner surface 11 of the crimp barrel 1. The crimp barrel 1 is proportioned with respect to the line 2 in accordance with well-known prior art considerations. The aperture 15 is proportioned to the crimp barrel 1 to provide for reliable retention as further described below. For reference purposes, it may be said that the apertures 14–17 are formed in an upper side 20 of the crimp barrel 1; the opposite portion of the crimp barrel 1 is a lower side 21.

Figure 3:
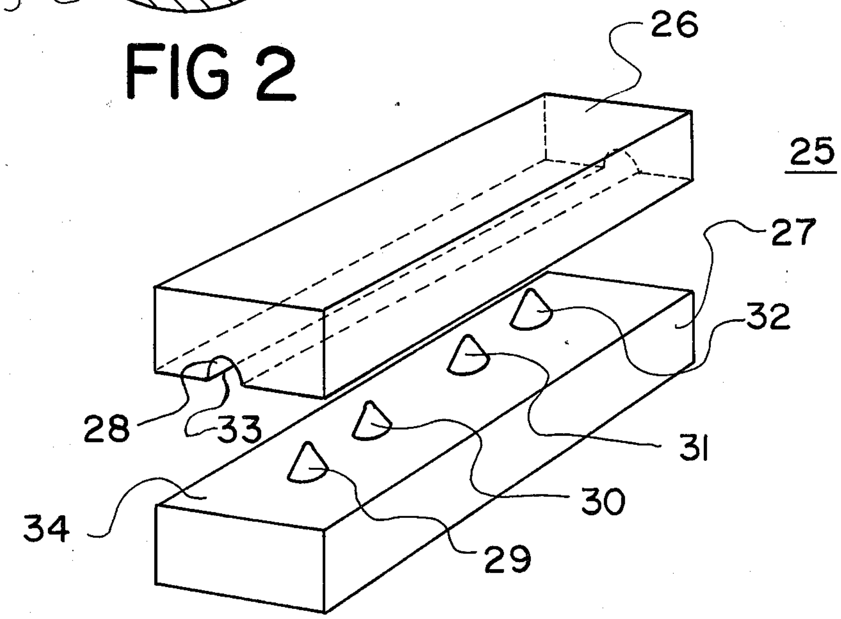
FIG. 3 is an perspective illustration of upper and lower dies comprising means for applying forces at selected points along the housing.

FIG. 3 is an perspective view of a crimping tool 25 comprising an upper die 26 and a lower die 27. The terms upper and lower are purely arbitrary and are utilized for establishing reference points in the present description. In practice, the dies 26 and 27 could be inverted. Alternatively, neither would be upper or lower, but the dies 26 and 27 would be embodied in well-known apparatus such as a hand-held forming tool known in the art. The upper die 26 includes a recess 28 extending in an axial direction 4 retaining the crimp barrel 1 in place. The lower die 27 includes axially spaced indentors 29–32 projecting upwardly therefrom. The indentors 29–32 are utilized to provide a force to the crimp barrel 1. The indentors 29–32 are each positioned on the lower die 26 to be in axial registration with and opposite the apertures 14–17 respectively. The crimp barrel 1 is placed in the recess, and a lower surface 33 of the upper die 26 is brought into engagement with an upper surface 34 of the lower die 27. Each indentor 29–32 engages the lower side 21 of the crimp barrel 1 at an indenting point 35. The crimping operation is explained with respect to FIGS. 4 and 5.

Figure 4:
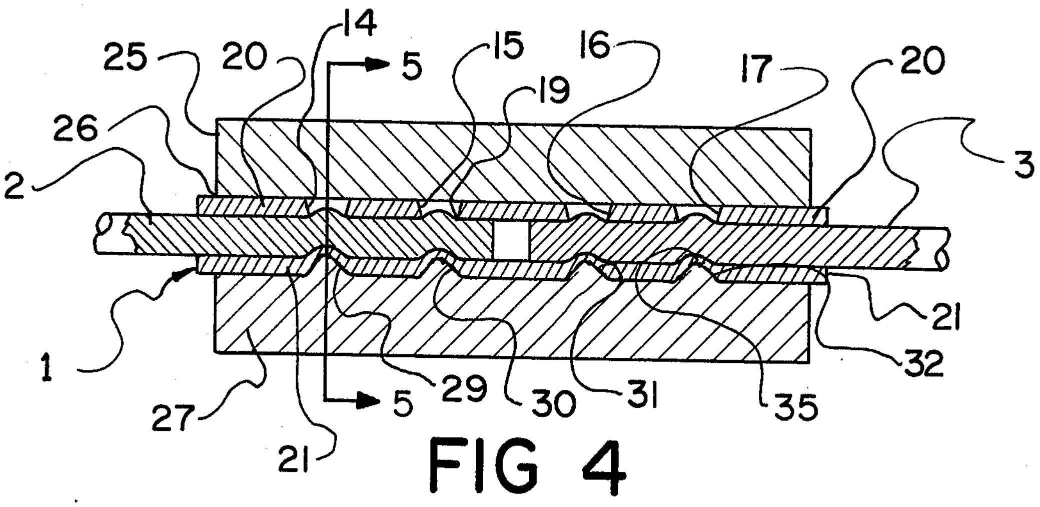
FIG. 4 is a cross-sectional view of the apperatus of FIG. 1 being crimped in the apperatus of FIG. 3.
Figure 5:
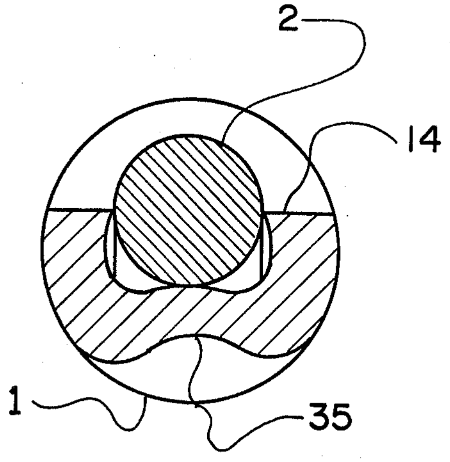
FIG. 5 is a cross-sectional view of a line crimped in a housing and taken along lines 5—5 of FIG. 4.
Figure 7:
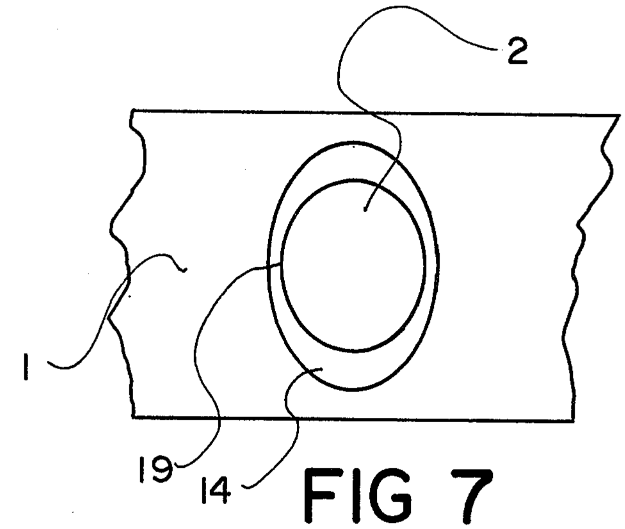
FIG. 7 is a partial plan view of FIG. 6 illustrating the engagement of interface edges with a line.

FIG. 4 is an axial cross section of the housing 1 inserted in the crimping tool 25 in its closed position illustrating the lines 2 and 3 being crimped in the crimp barrel 1. FIG. 5 is a transverse cross section taken along lines 5—5 FIG. 4 illustrating the line 2 crimped in the crimp barrel 1. It is seen in FIG. 4 that the indentor 29 is proportioned with respect to the aperture 14. In operation, the indentor 29 engages the lower side 21 of the crimp barrel 1 and deforms the portion of the crimp barrel 1 and line thereto in axial registration therewith. A portion of the line 2 is deformed and pushed up to contact the interface edge 19 of the aperture 14 at axially displaced edges. If the transverse width of the aperture 14 is less than that of the line 2, portions of the crimp barrel 1 transversely adjacent the aperture 14 may be transfersely flared. The uppper surface of the line 2 is wiped firmly against the interface edge 19. The permanent deformation of the lower portion 21 of the housing 1 and portion of line 2 in registration with the indentor 29 is sufficient to cause a gas tight joint to be formed. The engagement of the line 2 with the interface edge 19 is further illustrated in FIG. 7 which is a plan view. The interface edge 19 may dig in slightly into the line 2 for a firm seal. However, the degree of deformation of the line 2 is not significant with respect to the transverse cross section thereof. In other words, while the line 2 is permanently and locally displaced from its axial axis, the line 2 remains substantially undeformed in the transverse direction. This is a particularly useful feature, since materials sensitive to notching, such as steel wire, are not severely affected.

Figure 6:
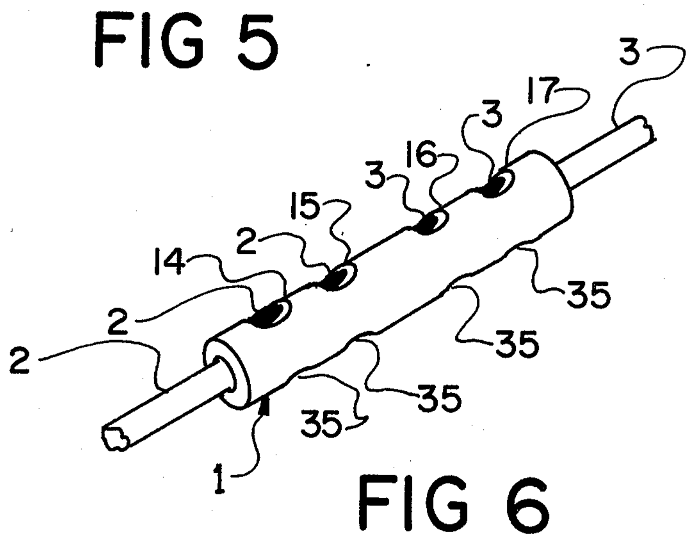
FIG. 6 is an illustration similar to FIG. 1 after crimping.

FIG. 6 is an perspective view of the lines 2 and 3 crimped in the splice barrel 1 in accordance with the present invention. It is noted that the crimp barrel 1 is deformed at indenting points 35 and portions of the lines 2 and 3 in registration with each indenting point 35 each project into one of the apertures 14–17. The pressure between the line and the interface edges 19 of each aperture forms a gas tight joint which keeps out moisture or other contaminants to improve integrity and life of the connection. As tension is applied to the lines 2 or 3 in an axial direction, the areas of contact between the surfaces of the lines 2 or 3 and the interface edges 19 increase in size due to the tension increasing the pressure between the surfaces of the lines 2 and 3 and the interface edges 19. When tension is applied, movement of the lines 2 or 3 is successfully impeded by the deformity and above-described contact. The lines 2 and 3 are further restrained from straightening due to the permanent deformation of the crimp barrel 1. Any inherent tendency of the crimped components to straighten themselves out is reduced to a minimum, since each of the apertures 14–17 provide little or no opposing force toward the indenting points 35 tending to loosen the crimp.

In the present exemplification, two apertures are shown in registration with each line end. The number of apertures used and indenting points 35 provided increases the tensile strength of the connection. The number of crimps which is optimum (optimum being a measure of complexity of assembly and manufacture of the crimp barrel v. tensile strength provided) is a function of the dimensions and materials of which the crimp barrel and lines 2 and 3 are made. For example, in an embodiment in which steel wires comprise the lines 2 and 3 and the lines 2 and 3 each have a diameter 0.040 inches, and in which the crimp barrel is copper plated steel having a thickness of approximately 0.020 inches, it is found that providing three crimps on each line will provide a connection having a tensile strength equal to the tensile strength of the lines 2 and 3. Fewer crimps may be used where wire is deformed to a greater degree. However, it may not be desireable to severly deform certain material.

Figure 8:
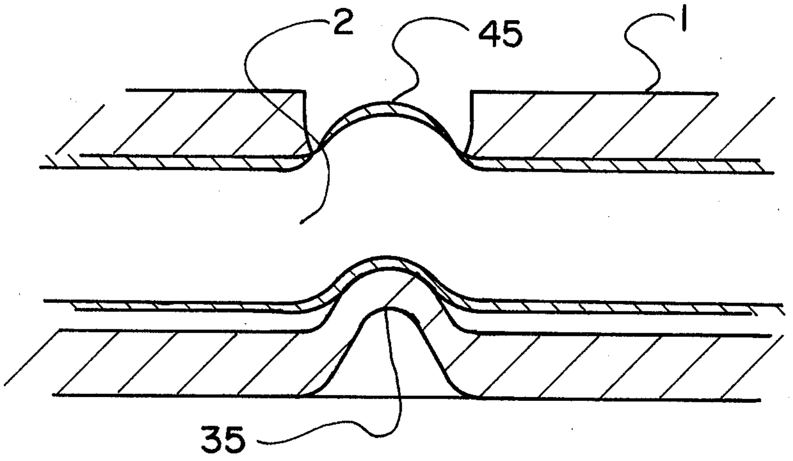
FIG. 8 is an illustration of a further embodiment of the present invention in which localized removal of electrical insulation may be achieved during crimping.

FIG. 8 is a cross-sectional view similar to FIG. 4 of a further embodiment of the present invention. The same reference numerals denote elements corresponding to those of the embodiment of FIGS. 1–7. In FIG. 8, a line 2 is provided having electrical insulation or other coating 45 formed thereon. In operation, the housing 1 is deformed as in the previous embodiment. However, the interface edges 19 scrape the coating 45 away from the upper surface of the line 2 so that the upper surface of the housing 1 may form an electrical connection with the line 2.

Figure 9:
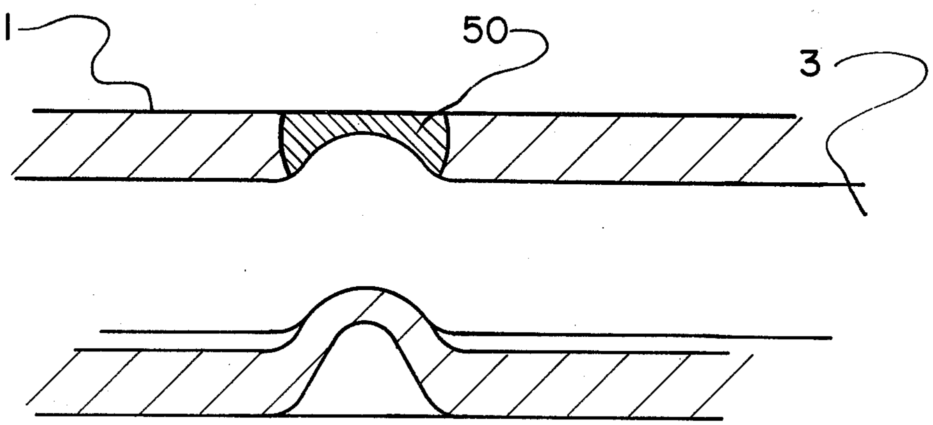
FIG. 9 is a cross-sectional illustration of a further embodiment of the present invention in which discontinuities in the housing comprise soft portions rather than apertures.

FIG. 9 is another partial cross-sectional view similar to FIG. 4 illustrating a further embodiment in which discontinuities 50 are provided in place of the apertures 14–17. The discontinuities 50 may comprise weaker portions of an upper surface of the splice barrel 1 which may be circular or otherwise shaped. Operation proceeds as with the embodiment of FIG. 4. However, rather than having the portions of the line 2 in registration with the indentors 29 or 30 extending through an aperture, they abutt and deform the soft portion comprising the discontinuity in the housing 1. This embodiment may be useful where it is desired to have no apertures in a housing 1.

What is thus provided is a method and construction in which highly reliable and strong crimps are provided. Improved holding is provided because of engagement of discontinuity interfaces with deformed lines. The connection does not rely on surface friction. Further, a more reliable connection is provided with less mechanical force. Because force is selectively applied at specific indentation points rather than around the whole periphery of a crimp barrel, applied force is most efficiently utilized. The above method and construction may be used for terminations or connections. One or more lines may be inserted in one end of a housing and the shape of the housing modified accordingly. Also, first and second (or more) lines inserted in a housing from opposite sides may be inserted side by side rather than in along one axis. The lines may be electrical conductors or nonconductors. The above teachings have been written with a view toward enabling those skilled in the art to make many modifications to the particular embodiments described to provide connections and terminations within the scope of the present invention.

What is claimed as new and desired to be secured by Letters Patent of the United States is:

1. A mechanical connection comprising, in combination:

a generally tubular, deformable housing said housing forming a line passageway therein, said housing having first and second end openings therein adapted for the admittance of at least one line, said passageway being of slightly larger diameter than said lines to be admitted;

at least one aperture formed in said housing and axially spaced from said end openings, said aperture intersecting said line passageway and having a sharp tapered edge formed at said intersection between said aperture and said line passageway; said aperture being an excision extending through the exterior of said housing and being formed along an axis transverse to and laterally spaced from the exterior of said housing, at least one line axially disposed in said housing passageway;

non-perforating deformations formed in said housing such that a point of said housing opposite each of said aperture is deformed inwardly and the portion of said line in registration therewith is deformed such that said line projects into said aperture and engages an interface of said aperture with said housing, and said point of said housing oposite each of said apertures is deformed to a distance from said aperture which is less than the diameter of said line disposed within said housing.

2. The joint of claim 1 wherein said housing comprises a splice barrel.

3. The joint according to claim 2 wherein first and second line ends are axially disposed in opposite ends of said splice barrel and crimped whereby a splice is provided.

4. A joint according to claim 2 wherein said lines comprise electrically insulated wires and insulation is scraped from said wire at said interface.

5. A mechanical connection device comprising:

a generally tubular housing forming a line passageway therein said housing having first and second end openings therein adapted for the admittance of at least one line, said passageway being of slightly larger diameter than said lines to be admitted;

said housing having at least one axially spaced aperture formed in said housing and axially spaced from said openings, said aperture being an ercision extending through the exterior of said housing and being formed along an axis transverse to and laterally spaced from the exterior of said housing said aperture intersecting said line passageway and having a sharp tapered edge formed at said intersection between said aperture and said line passageway;

said housing being further defined as being deformable whereby a portion of said housing opposite said aperture may be indented in registration with said aperture such that a line contained within said housing line passageway is deformed so as to provide for the engagement of said line at the interface of said aperture and said housing.

* * * * *